(12) United States Patent
Caicedo Fernandez et al.

(10) Patent No.: US 10,448,006 B2
(45) Date of Patent: Oct. 15, 2019

(54) PEOPLE SENSING SYSTEM

(71) Applicant: SIGNIFY HOLDING B.V., Eindhoven (NL)

(72) Inventors: David Ricardo Caicedo Fernandez, Eindhoven (NL); Ashish Vijay Pandharipande, Eindhoven (NL); Sandeep Kumar, Waalre (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/077,075

(22) PCT Filed: Feb. 1, 2017

(86) PCT No.: PCT/EP2017/052099
§ 371 (c)(1),
(2) Date: Aug. 10, 2018

(87) PCT Pub. No.: WO2017/137287
PCT Pub. Date: Aug. 17, 2017

(65) Prior Publication Data
US 2019/0045180 A1  Feb. 7, 2019

(30) Foreign Application Priority Data
Feb. 11, 2016  (EP) .................................. 16155237

(51) Int. Cl.
*H04N 17/00* (2006.01)
*G07C 9/00* (2006.01)
(Continued)

(52) U.S. Cl.
CPC ....... *H04N 17/002* (2013.01); *G06K 9/00362* (2013.01); *G06T 7/246* (2017.01);
(Continued)

(58) Field of Classification Search
CPC .............. H04N 17/002; H04N 5/2256; H04N 5/23245; G06T 7/246; G06K 9/00362; G07C 9/00
See application file for complete search history.

(56) References Cited

U.S. PATENT DOCUMENTS

| 5,457,493 A | 10/1995 | Leddy et al. |
| 8,295,545 B2 * | 10/2012 | Hampapur ............. G06T 7/251 382/103 |

(Continued)

FOREIGN PATENT DOCUMENTS

| EP | 2131328 A2 | 12/2009 |
| WO | 2007020549 A2 | 2/2007 |

(Continued)

*Primary Examiner* — Mishawn N. Hunter
(74) *Attorney, Agent, or Firm* — Meenakshy Chakravorty

(57) ABSTRACT

A method of testing a sensor unit which detects, locally at the sensor unit, whether a person appears in the images it captures. The method comprises causing a light-emitting device (e.g. screen of a user terminal) to emit a test pattern toward the sensor unit to be captured over a series of images, the test pattern comprising a spatio-temporal pattern of light simulating presence of a predetermined number of people. The method further comprises, at a processing apparatus external to the sensor unit, receiving one or more presence detection reports from the sensor unit indicating an apparent people count detected using the sensor unit when subject to the test pattern. The apparent people count is then compared with the predetermined number of people simulated by the test pattern. Based on this comparison, it is determining whether the sensor unit is functioning correctly.

15 Claims, 6 Drawing Sheets

(51) Int. Cl.
 *G06T 7/246* (2017.01)
 *G06K 9/00* (2006.01)
 *H04N 5/225* (2006.01)
 *H04N 5/232* (2006.01)

(52) U.S. Cl.
 CPC ............ *G07C 9/00* (2013.01); *H04N 5/2256* (2013.01); *H04N 5/23245* (2013.01); *G06T 2207/10152* (2013.01); *G06T 2207/30196* (2013.01); *G06T 2207/30232* (2013.01); *G06T 2207/30242* (2013.01)

(56) References Cited

U.S. PATENT DOCUMENTS

| | | |
|---|---|---|
| 8,648,908 B2 | 2/2014 | Ruohonen et al. |
| 9,245,333 B1 | 1/2016 | Beck et al. |
| 9,924,078 B2 * | 3/2018 | Wieser ................ G08B 13/248 |
| 2008/0118106 A1 | 5/2008 | Kilambi et al. |
| 2008/0239073 A1 | 10/2008 | Ruohonen et al. |
| 2009/0030643 A1 | 1/2009 | White et al. |
| 2011/0191078 A1 | 8/2011 | Davidich et al. |
| 2015/0032511 A1 * | 1/2015 | Haddad ............... G06Q 30/0205 705/7.34 |
| 2015/0178571 A1 | 1/2015 | Zhang et al. |
| 2015/0070516 A1 * | 3/2015 | Shoemake ....... H04N 21/42203 348/207.11 |
| 2015/0084523 A1 * | 3/2015 | Nishigaki .......... H05B 37/0227 315/154 |
| 2015/0181137 A1 * | 6/2015 | Terashima ............. G01S 17/89 348/162 |

FOREIGN PATENT DOCUMENTS

| | | |
|---|---|---|
| WO | 2012173465 A1 | 12/2012 |
| WO | 2017076715 A1 | 5/2017 |

* cited by examiner

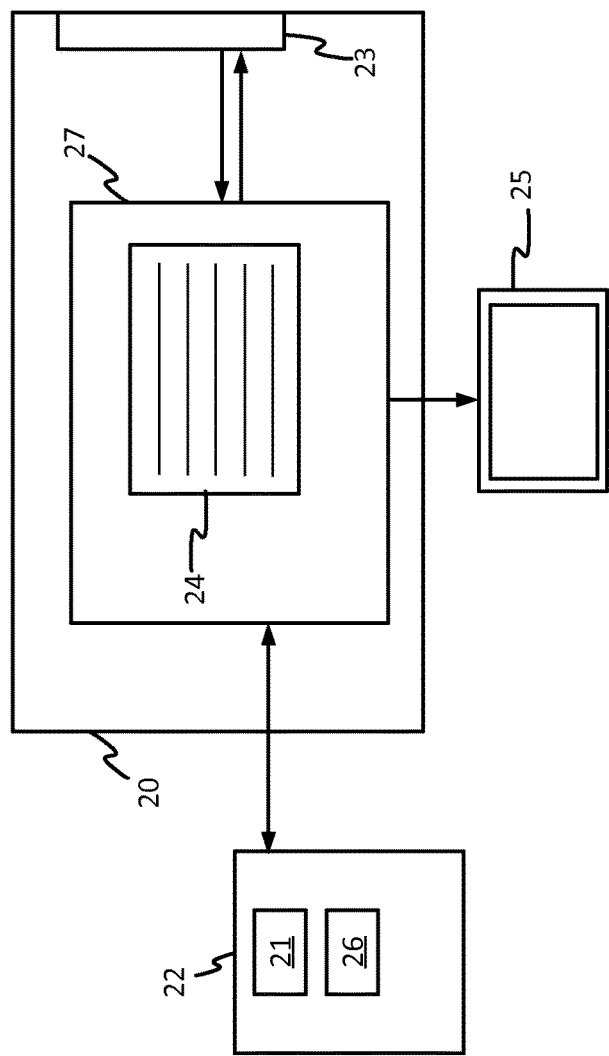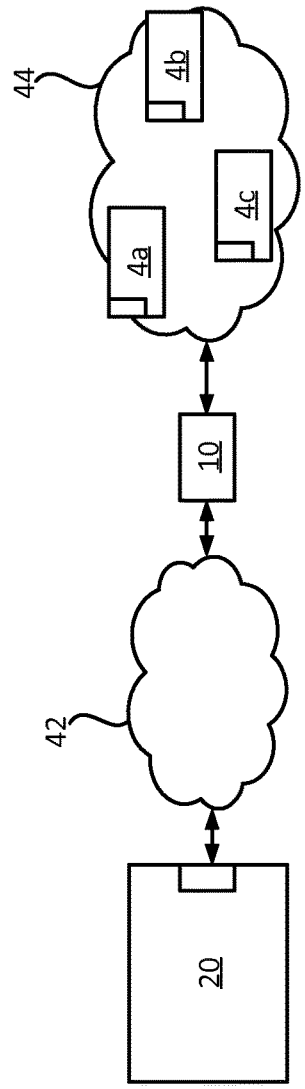

PEOPLE SENSING SYSTEM

CROSS-REFERENCE TO PRIOR APPLICATIONS

This application is the U.S. National Phase application under 35 U.S.C. § 371 of International Application No. PCT/EP2017/052099, filed on Feb. 1, 2017, which claims the benefit of European Patent Application No. 16155237.7, filed on Feb. 11, 2016. These applications are hereby incorporated by reference herein.

TECHNICAL FIELD

The present disclosure relates to an image sensing system for capturing images and for sensing presence of people appearing in the images.

BACKGROUND

There are a number of applications in which it may be desirable to detect a count of people over a particular area, such as space optimization, planning and maintenance, HVAC control, and data analytics driven marketing. For example, people count may be useful as one of the items of input data in a marketing analysis. Or for space optimization, a count of people in (pseudo) real time may be useful to identify temporal and spatial usage patterns. In another example, people sensors may be used in a lighting system to extract information relating to people in the area covered by the lighting system. More modern lighting systems can incorporate sensors into the lighting network, e.g. by incorporating a sensor in each luminaire, so as to allow the aggregation of sensor data from multiple sensors in the environment. Using suitable sensors, this allows the luminaires to share information on, say, occupancy, activity patterns, changes in temperature or humidity, daylight levels, etc.

Historically, such sensor mechanisms have been relatively unsophisticated. For example, combinations of timers and motion sensors have been used to selectively active luminaires in response to recently sensed movement in the environment. An example of such a motion sensor is a passive infra-red ("PIR") motion sensor, which uses infrared radiation emitted from moving bodies to detect their motion. More recently, people counting techniques have used the aggregation of sensor data from individual image capture devices (or "vision sensors") to generate a count of people in the area covered by their field of view. For instance, such a system may be part of a connected lighting system with a vision sensor in each luminaire, or a vision sensor associated to a group of luminaires. A vision sensor, optimized for cost and complexity, can provide much richer data than a conventional PIR sensor that is commonly used in lighting systems.

A number of other potential problems may occur with an image sensing unit. For instance, the sensor unit may develop an internal fault (e.g. failure of the sensor element, or malware), or the sensor unit may be subject to unauthorized or unskilled modification. Such problems may lead to the performance of the sensor being compromised, i.e. an incorrect number of people are reported. Such situations may in turn lead to application errors or misbehaviour, e.g. errors in estimated number of people at a higher system level.

U.S. Pat. No. 8,648,908 recognizes that sensor errors can occur in visitor counting systems, and that this can result in an incorrect people count. To address this, this document teaches that the results from the sensor are tagged with a time stamp or sequential record number. When the results are then examined, a missing timestamp or counter values is taken as indicative of a faulty sensor.

SUMMARY

However, there are problems that can occur with a vision sensor that will not cause missing images and therefore will not show up by looking for missing timestamps or record numbers. For instance, say there is a fault with the image sensor element, or malware, or an unauthorized on unskilled modification of the vision sensor; this may result in a person not being recognized in one or more of the captured images, or even a person being falsely identified in one or more of the images, regardless of whether a complete series of images has been captured. U.S. Pat. No. 8,648,908 would miss such errors.

A simple method for checking the status of a vision sensor is to perform a manual check at an instant in time when the ground-truth is observable. In this case, the manual count of the number of people in the corresponding area during a pre-defined time window is then compared with the reported number from the vision sensor. However, this method is expensive and cumbersome, and the testing procedure also does not scale due to the involved human effort. Additionally, the vision sensor may be reporting errors only from certain directions which may not be observable during the short window of time when the manual checking is performed.

An alternative method is to perform analysis of the actual images captured by the vision sensor in a back-end system in order to identify possible errors. However, this raises privacy issues. That is, people subject to the people counting system may prefer that the images in which they are identifiable are not made available for any purpose other than simply detecting, locally at the sensor, on a yes/no basis, whether or not a person is detected to be present in the image (and perhaps where in the image). If the images were also to be provided externally to the sensor unit in order to check for commissioning errors or such like, then the subjects may be uncomfortable with this. Instead therefore, according to the present disclosure, to provide high assurances of privacy to the occupants of the space in which a vision sensor is used, such images are never stored or exported externally from the sensor unit to a backend system. Rather, only a yes/no presence decision is exported externally from the sensor. Optionally in embodiments, the sensor unit may export other information such as a vector indicating where in the image presence was detected, or a low resolution (e.g. 10×10) matrix of presence decisions, but still not a high enough resolution image to allow a person or at least the identity of an individual person to be recognized in the image by a human or computer.

Given the above, centralized back-end analysis of captured images cannot be used to check for errors without compromising the privacy assurances of the system.

It would therefore be desirable to provide an alternative technique for detecting errors in a vision sensor system used for people counting.

According to one aspect disclosed herein, there is provided a method of testing a sensor unit comprising an image sensor and a local processing module, wherein the local processing module is configured to detect, locally at the sensor unit, whether a person appears in images captured by the image sensor; the method comprising: causing a light-emitting device, external to the sensor unit, to emit a test pattern toward the image sensor of the sensor unit to be captured over a series of the images captured by the image sensor, the test pattern comprising a spatio-temporal pattern of light simulating presence of a predetermined number of people appearing in view of the image sensor over time, wherein said predetermined number is more than one; at a processing apparatus external to the sensor unit, receiving one or more presence detection reports from the sensor unit indicating an apparent people count detected using the sensor unit, the apparent people count being a number people detected by the local processing module based on the captured images of the test pattern; and comparing the apparent people count with the predetermined number of people simulated by the test pattern, and, based on said comparison, determining whether the sensor unit is functioning correctly.

Thus the performance or behaviour of the vision sensor can be diagnosed by using an external device (e.g. a device with a display such smartphone) to generate a pre-defined test pattern (e.g. image sequence) which the vision sensor should detect as a given count of people within its field of view. This allows for a thorough testing of the vision sensor without compromising on the privacy assurances promised by the system.

In embodiments, the apparatus may be implemented in said external device. Alternatively the processing apparatus may be a centralized processing apparatus arranged to receive presence detection reports from the sensor unit and one or more other sensor units, the centralized processing apparatus being separate from said light-emitting device.

In embodiments, the light-emitting device may be a mobile user terminal comprising a display screen, and the test pattern may comprise a sequence of frames displayed on said display screen, in which a plurality of graphical elements simulate the presence of said predetermined number of people to the sensor unit.

In embodiments, the local processing module of the sensor unit may be configured to perform said detection based on detecting motion in the captured images, and said graphical elements may simulate the presence of said predetermined number of people by moving within a frame area of the displayed frames.

Alternatively or additionally, the local processing module of the sensor unit may be configured to perform said detection based on an image recognition algorithm applied to the captured images to recognise human bodies or human body parts in the captured images, and said graphical elements may simulate the presence of said predetermined number of people by graphically representing human bodies or human body parts in the displayed frames.

In embodiments, the light-emitting device may comprise a directable illumination source operable to emit illumination in a controllable direction, in which case the local processing module of the sensor unit may be configured to perform said detection based on detecting motion in the captured images, and the test pattern may be created by varying the direction of the directable illumination source over time. E.g. the directable illumination source may be a laser pointer or a spotlight.

In embodiments, the light-emitting device may comprise a set of illumination sources, in which case the local processing module of the sensor unit may be configured to perform said detection based on detecting motion in the captured images, and the test pattern may be created by turning on or dimming up different ones of the set of illumination sources in a sequence over time.

In embodiments, the sensor unit may be operable in an operational mode and a diagnostic mode, wherein in the diagnostic mode the apparent people count is indicated as being distinct from any people counting results obtained when said detection of people is performed in the operational mode.

In embodiments, the method may comprises operating the light-emitting device, or one or more other illumination sources, to emit light toward the image sensor of the sensor unit signalling a predefined escape code, and the sensor unit may be configured to recognize the escape code and to be triggered by said recognizing of the escape code to enter the diagnostics mode.

In embodiments, the escape code may comprise a tag included in one, some or all of the displayed frames.

In embodiments, the one or more presence detection reports may comprise a plurality of reports each indicating an individual detection of a person, and the apparent people count may be counted by the external processing apparatus based on the plurality of reports. Or alternatively, the apparent people count may be counted at the local processing module of the sensor unit, and the one or more reports may comprise one report reporting the people count.

In embodiments, the method may be repeated on a plurality of occasions, and said predetermined number may be varied between different ones of said occasions.

In embodiments, the image sensor of the sensor unit may be a visible light camera, and the test pattern may be a visible test pattern comprising a spatio-temporal pattern of visible light simulating the presence of said predetermined number of people to the sensor unit.

Alternatively, in embodiments the image sensor of the sensor unit may comprise an infrared image sensor, and the test pattern may comprise an inferred test pattern comprising a spatio-temporal pattern of infrared light simulating the presence of said predetermined number of people to the sensor unit.

According to another aspect disclosed herein, there is provided a computer program product for testing a sensor unit comprising an image sensor and a local processing module, wherein the local processing module is configured to detect, locally at the sensor unit, whether a person appears in images captured by the image sensor; the computer program product comprising software code embodied on computer-readable storage and/or being downloadable therefrom, the software code being configured so as when executed on one or more processors of one or more devices to perform operations of: causing a light-emitting device, external to the sensor unit, to emit a test pattern toward the image sensor of the sensor unit to be captured over a series of the images captured by the image sensor, the test pattern comprising a spatio-temporal pattern of light simulating presence of a predetermined number of people appearing in view of the image sensor over time, wherein said predetermined number is more than one; at a processing apparatus external to the sensor unit, receiving one or more presence detection reports from the sensor unit indicating an apparent people count detected using the sensor unit, the apparent people count being a number people detected by the local processing module based on the captured images of the test pattern; and comparing the apparent people count with the predetermined number of people simulated by the test pattern, and, based on said comparison, determining whether the sensor unit is functioning correctly.

In embodiments, the code may be further configured so as to perform any of the methods disclosed herein.

According to another aspect disclosed herein, there is provided a system comprising: a sensor unit comprising an image sensor and a local processing module, wherein the local processing module is configured to detect, locally at the sensor unit, whether a person appears in images captured by the image sensor; a light-emitting device external to the sensor unit, configured to emit a test pattern toward the image sensor of the sensor unit to be captured over a series of the images captured by the image sensor, the test pattern comprising a spatio-temporal pattern of light simulating presence of a predetermined number of people appearing in view of the image sensor over time, wherein said predetermined number is more than one; and processing apparatus operatively coupled to the sensor unit but external to the sensor unit, wherein the external processing apparatus is arranged to receive one or more presence detection reports from the sensor unit indicating an apparent people count detected using the sensor unit, the apparent people count being a number people detected by the local processing module based on the captured images of the test pattern; wherein the processing apparatus or light-emitting device is configured to compare the apparent people count with the predetermined number of people simulated by the test pattern, and, based on said comparison, to determine whether the sensor unit is functioning correctly.

In further embodiments, the system may be further configured in accordance with any of the methods disclosed herein.

BRIEF DESCRIPTION OF THE DRAWINGS

For a better understanding of the present invention, and to show how embodiments of the same may be carried into effect, reference is made to the following figures, in which:

FIG. 4 is a schematic block diagram of a central processing unit for operating a lighting system,
FIG. 4A is a schematic block diagram illustrating an exemplary control architecture of a lighting system.

DETAILED DESCRIPTION OF EMBODIMENTS

"Vision sensors" comprising visible light cameras are useful for people counting. Consider a system wherein for privacy reasons each vision sensor does not provide entire images to a central processing device when operating in real time, but only presence decisions based on performing the image recognition locally at the sensor (where the presence decision could be a soft or hard decision, and could be accompanies by an indication of a position of the presence detection). The vision sensors may have overlapping field-of-views (FoVs) and sensing areas. In a vision sensor system, it may happen that one or more issues arise that are related to errors in commissioning or failures in the vision sensors later during actual operation. Such errors or failures may result in errors in estimated number of people over a particular space, and in turn may lead to application errors at a higher system level that are not immediately noticeable, e.g. workspace usage errors for space optimization applications. Errors may occur for example due to (i) failures in the vision sensor (e.g. a fault in the image sensor element, or malware) and/or (ii) unauthorized or unskilled modification of the vision sensor. The following discloses methods for diagnosing errors in a vision system with respect to count of people. In embodiments, the method uses an external device with a display, e.g. a smartphone, that might be used by a maintenance person to evaluate the status of each vision sensor in the system. The external device generates image sequences that are detected as count of people by the vision system. A mismatch between the expected count and the reported count by the vision sensor is reported as an error of the vision sensor.

Figure 1:
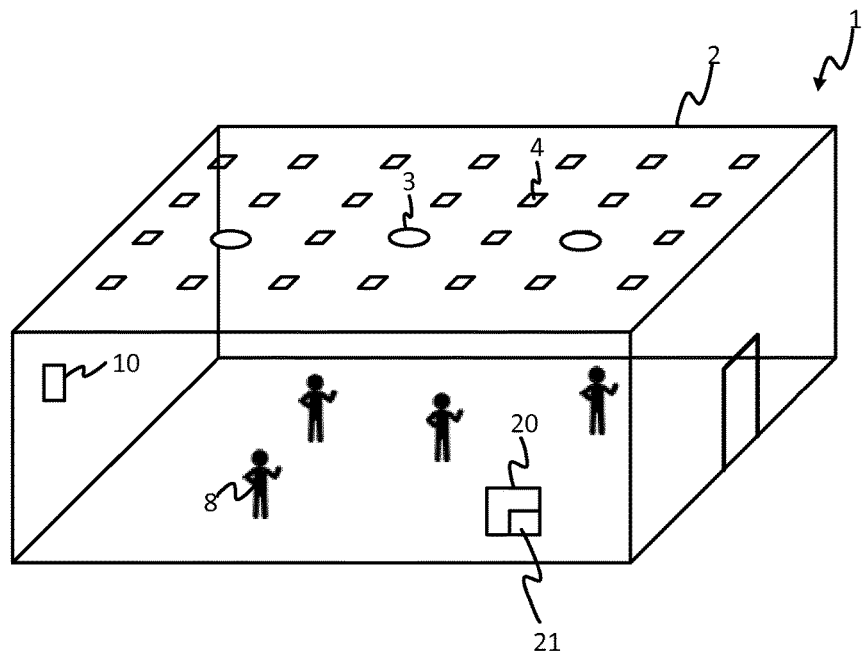
FIG. 1 is a schematic illustration of a lighting system.

FIG. 1 illustrates an exemplary lighting system 1 in which the techniques disclosed herein may be employed. The system 1 comprises a plurality of luminaires 4 installed in an environment 2, arranged to emit illumination in order to illuminate that environment 2. In embodiments, the system may further comprise a gateway 10 to which each of the luminaires 4 is connected via a first wired or wireless networking technology such as ZigBee. The gateway 10, sometimes referred to as a lighting bridge, connects to a processing apparatus 20 (which may or may not be physically present in the environment 2) via a second wired or wireless networking technology such as Wi-Fi or Ethernet. The processing apparatus 20 may for example take the form of a server (comprising one or more server units at one or more sites), or a user terminal such as a smartphone, tablet, laptop or desktop computer, or a combination of any such devices. It is able to control the luminaires 4 by sending control commands to the luminaires 4 via the gateway 10, and/or is able to receive status reports from the luminaires 4 via the gateway 10. Alternatively in embodiments the gateway 10 may not be required and the computing apparatus 20 and luminaires 4 may be equipped with the same wired or wireless networking technology, by which they may be connected directly into the same network in order for the computing apparatus 20 to control the luminaires 4 and/or receive the status reports from the luminaires 4.

In the illustrated example, the environment 2 is an indoor space within a building, such as one or more rooms and/or corridors (or part thereof). The luminaires 4 are ceiling-mounted, so as to be able to illuminate a surface below them (e.g. the ground or floor, or a work surface). They are arranged in a grid along two mutually perpendicular directions in the plane of the ceiling, so as to form two substantially parallel rows of luminaires 4, each row being formed by multiple luminaires 4. The rows have an approximately equal spacing, as do the individual luminaires 4 within each row. However it will be appreciated that this is not the only possible arrangement. E.g. in other arrangements one or more of the luminaires 4 could be mounted on the wall, or embedded in the floor or items of furniture; and/or the luminaires 4 need not be arranged in a regular grid; and/or the environment 2 may comprise an outdoor space such as a garden or park, or a partially-covered space such as a stadium or gazebo (or part thereof), or a combination of such spaces.

Multiple people 8 may occupy the environment, standing on the floor below the luminaires 4. The environment 2 is also installed with one or more "vision sensor" units 3, each of which being a visible-light based imaging unit for detecting the presence of people 8 in the environment based on the images it captures. E.g. these may also be mounted on the ceiling in a regular pattern amongst the luminaires 4, and may be arranged to face downwards towards the illuminated surface beneath (e.g. the ground or floor, or a work surface). Alternatively the sensor units 3 may be mounted in other places such as the wall, facing in other directions than downwards; and/or they need not be installed in a regular pattern.

The luminaires 4 have known identifiers ("IDs"), unique within the system in question, and are installed at known locations. The vision sensor units 3 also have known IDs, and are also installed at known locations in the environment 2. The sensor units 3 are not necessarily co-located with the luminaires 4. The locations of the luminaires 4 are determined during a commissioning phase of the luminaires 4, i.e. before the luminaires 4 and sensor units 3 are actually put into operation for their purpose of illuminating the environment 2 and detecting presence of people 8 respectively. Typically commissioning is performed at the time of installation or shortly afterwards. During commissioning of the luminaires 4, a commissioning technician determines the location of each of the luminaires 4, either manually or using automated means such as GPS or another such satellite based positioning system. This may be the location on any suitable reference frame, e.g. coordinates on a floorplan, map of the area, or global coordinates. By whatever means and in whatever terms determined, the commissioning technician then records the location of each luminaire 4 in a commissioning database 21 mapped to its respective luminaire ID. The commissioning technician also performs a similar commissioning process for the sensors 3 during a commissioning phase of the sensor units 3, i.e. prior to the actual operational phase, before the vision sensors 3 are actually put into operation for their purpose of detecting presence of people 8. The sensor commissioning phase comprises storing the location of each in the commissioning database 21 mapped to its respective sensor ID.

Note that the commissioning database 21 could be anything from a large database down to a small look-up table. It could be implemented on a single device or multiple devices (e.g. computing apparatus 20 represents a distributed server, or a combination of server and user terminal). E.g. the table mapping the vision sensor locations to the vision sensor IDs could be implemented separately from the table mapping the luminaire locations to the luminaire IDs. Of course it will also be appreciated that the commissioning could be performed over different occasions, and/or by more than one technician. E.g. the commissioning of the vision sensors 3 could be performed by a different commissioning technician on a later occasion than the commissioning of the luminaires 4.

Knowing the locations of the sensors 3, or knowing the locations of the luminaires 4 and the locations of the sensors 3 relative to the luminaries, this allows the location of a person (e.g. on a floorplan or map) to be determined based on the sensor units 3.

In other embodiments, each of one, some or all of the sensor units 3 may be incorporated into the housing of a respective one of the luminaires 4. In this case the locations of the luminaires 4 are known relative to the sensor units 3 implicitly, i.e. can be assumed to be co-located.

Figure 2:
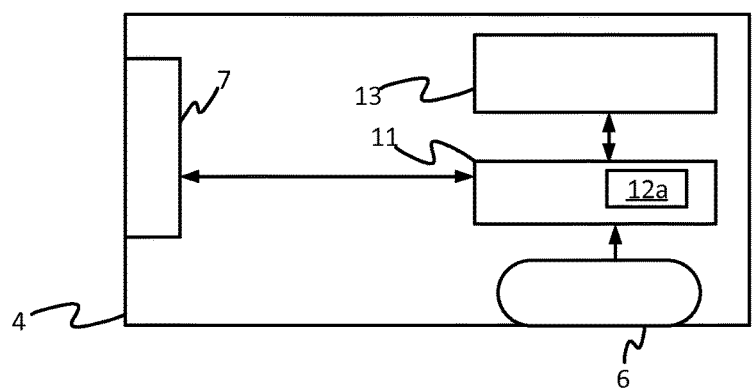
FIG. 2 is a schematic block diagram of a sensor unit.

FIG. 2 shows a block diagram of a vision sensor unit 3, representing the individual configuration of each sensor unit 3 in the lighting system 1. The sensor unit 3 comprises: an image sensor 6 in the form of a visible light camera, a local processing module 11, a network interface 7, and a local memory 13 connected to the local processing module 11. The camera 6 is preferably a visible light camera. However, the use of a thermal camera is not excluded. The local processing module 11 is formed of one or more processing units, e.g. CPUs, GPUs etc.; and the local memory 13 is formed of one or more memory units, such as one or more volatile or non-volatile memory units, e.g. one or more RAMs, EEPROMs ("flash" memory), magnetic memory units (such as a hard disk), or optical memory units. By whatever means implemented, the local memory 13 stores code 12a arranged to run (e.g. execute or be interpreted) on the local processing module 11, the processing module 11 thereby being configured to perform operations of the sensor unit 3 in accordance with the following disclosure. Alternatively the processing module 11 could be implemented in dedicated hardware circuitry, or configurable or reconfigurable hardware circuitry such as a PGA or FPGA.

By whatever means implemented, the local processing module 11 is operatively coupled to its respective camera 6 in order to receive images captured by the camera 6, and is also operatively coupled to the network interface 7 in order to be able to communicate with the processing apparatus 20. The processing apparatus 20 is external to each of the sensor units 3 and luminaires 4, but arranged to be able to communicate with the sensor units via the respective interfaces 7, and to communicate with the luminaires 4 via a similar interface in each luminaire 4 (not shown).

Figure 2A:
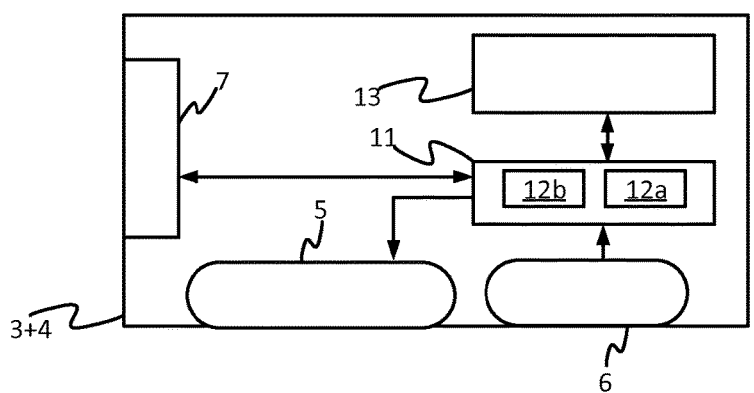
FIG. 2A is a schematic block diagram of a luminaire with embedded sensor unit.
Figure 2B:
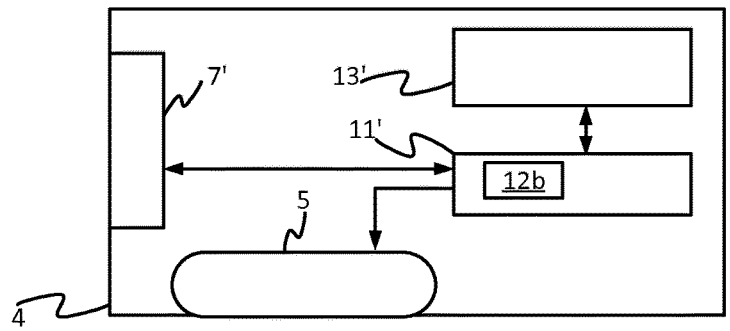
FIG. 2B is a schematic block diagram of a luminaire.

FIG. 2B shows an example of a luminaire 4 in embodiments where the luminaires 4 are separate to the sensor units 3. Here, each luminaire 4 may comprise one or more lamps 5, a respective interface 7', a local memory 13' and a local processing module 11'. The local processing module 11' is operatively coupled to the lamp(s) and the interface 7'. Each lamp 5 may comprise an LED-based lamp (comprising one or more LEDs), a filament bulb, a gas-discharge lamp or any other type of light source. The memory 13' comprises one or more memory units and the processing module 11' comprising one or more processing units. The local memory 13' stores code 12b arranged to run (e.g. execute or be interpreted) on the local processing module 11', the processing module 11' thereby being configured to perform operations of a luminaire 4 in accordance with the present disclosure. Alternatively the processing module 11' of the luminaire 4 could be implemented in dedicated hardware circuitry, or configurable or reconfigurable hardware circuitry such as a PGA or FPGA.

In general each of the above-mentioned interfaces 7, 7' could be a wired or wireless interface, but is preferably wireless. For example in embodiments the interface 7 of each of the sensor units 3, and the interface 7' of each of the luminaires 4, may be a ZigBee interface arranged to connect to the gateway 10 using a first wireless networking protocol such as one of the ZigBee standards, e.g. ZigBee Light Link; while the processing apparatus 20 (e.g. a server, or a desktop computer, laptop, tablet or smartphone running a suitable application) connects to the gateway 10 via a second wireless networking protocol such as Wi-Fi or Bluetooth. The gateway 10 then converts between the protocols to allow the external processing apparatus 20 to communicate in one or both directions with the sensor units 3 and luminaires 4. Alternatively, the interface 7 in each of the sensor units 3, and the interface 7' in each of the luminaires 4, may comprise an interface of a type (e.g. Wi-Fi or Bluetooth) directly compatible with that of the external processing apparatus 20, thus allowing the communication to occur directly between the processing apparatus 20 and the sensor units 3 and luminaires 4 without the need for a gateway 10. Generally the network can have any suitable network topology, for example a mesh topology, star topology or any other suitable topology that allows signals to be transmitted and received between each luminaire 4 and the gateway 10 and/or processing apparatus 20.

Whatever the network topology, the external processing apparatus 20 is configured to send control commands to the sensor units 3 and luminaires 4 and to receive information back from the sensor units 3 and luminaires 4, via the relevant interfaces 7, 7'. This includes receiving soft or hard presence decisions from the sensor units 3. The various communications disclosed herein between components 3, 4, 20 may be implemented by any of the above-described means or others, and for conciseness will not be repeated each time.

FIG. 2A shows a variant of the arrangement shown in FIGS. 1 and 2, wherein the sensor unit 3 is integrated into the same housing as one of the luminaires 4, and therefore the sensor unit 3 is substantially co-located with the respective luminaire 4. In this case, the combined luminaire and sensor 3, 4 unit further comprises (in addition to the components described above in relation to FIG. 2) at least one lamp 5 such as an LED-based lamp (comprising one or more LEDs), gas-discharge lamp or filament bulb. The communication with the combined sensor unit and luminaire 3, 4 may both implemented via a shared interface 7 of the unit, and/or any control, processing or reporting associated with the sensing and or luminaire functionality may be implemented by a shared local processing module 11. Alternatively separate interface 7' and/or separate local processing module 11' could be provided for each of the sensor and luminaire functions, but in the same housing.

By way of illustration, embodiments below may be described in terms of separate sensor units 3 and luminaires 4, as shown in FIGS. 1, 2 and 2B, but it will be appreciated that the various teachings disclosed herein can also apply in relation to the integrated arrangement of FIG. 2A.

The local processor 11' of the luminaire 4 (or the local processor 11 of the combined unit 3, 4) is connected to the lamp(s) 5, to allow local lighting control code 12b executed on the local processor 11' (or 11) to control the dimming level of the illumination emitted by the lamp(s) 5, and or to switch the emitted illumination on and off. Other illumination characteristic(s) such as colour may also be controllable. Where the luminaire 4 comprises multiple lamps 5, these may be individually controllable by the local processor 11' (or 11), at least to some extent. For example, different coloured lamps 5 or elements of a lamp 5 may be provided, so that the overall colour balance can be controlled by separately controlling their individual illumination levels.

The local controller 11' of the luminaire 4 may be configured to control one or more such properties of the emitted illumination based on lighting control commands received via the interface 7' from the external processing apparatus 20. E.g. the processing apparatus 20 may comprise a server arranged to receive presence metrics from the sensor units 3 indicative of whether and/or where people are present in the respective field of view of each sensor unit 3, and therefore where people are present in the environment 2. Based thereon, the processing apparatus 20 can make decisions as to which luminaires 4 to turn on and off, or which to dim up and down and to what extent, based on an overview of the presence detected by the different sensor units 3. And/or, the processing apparatus 20 may comprise a user terminal such as a smartphone, tablet or laptop running a lighting control application (or "app"), though which the user can select a desired adjustment to the emitted illumination, or select a desired lighting effect or scene to be created using the illumination. In this case the application sends lighting control commands to the relevant luminaires 4 to enact the desired adjustment or effect. In further alternative or additional arrangements, the local controller 11' of the luminaire 4 may be configured to control any one or more of the above properties of the illumination based on signals received from one or more other sources, such as one or more of the sensor units 3. E.g. if a sensor unit 3 detects occupancy then it may send a signal to a neighbouring luminaire 4 to trigger that luminaire to turn on or dim up.

In each sensor unit 3 (or combined unit 3, 4) the respective image sensor 6 is connected to supply, to its local processor 11, raw image data captured by the image sensor 6, to which a local person detection algorithm is applied by local image processing code 12a executed on the local processor 11. The local person detection algorithm can operate in a number of ways based any suitable image recognition techniques (e.g. facial recognition and/or body recognition). Based on this, the local person detection algorithm generates one or more "presence metrics" indicative of whether a person 8 is detected to be present in a still image or moving image (video) captured by the image sensor 6, and/or how many people 8 are detected to be so present. For example the one or more presence metrics may comprise: a hard indication of whether or not a person 8 is detected to be present in the image (yes/no), a soft indication of whether or not a person 8 is detected to be present in the image (an indication of a degree of certainty such as a percentage), or a momentary count of people 8 simultaneously present in the image, a count of the number of people appearing in the image over a certain window of time, and/or a rate at which people appear in the image. The code 12a running on the local processing module 11 reports this information to the external processing apparatus 20, for use in a determining a person count centrally.

Note, detecting whether a person appears in an image may comprise detecting whether a whole person appears in the image, or detecting whether at least a part of a person appears in the image, or detecting whether at least a specific part or parts of a person appears in the image. The detection could also be comprise detecting whether a specific person appears in the image, or detecting whether a specific category of person appears in the image, or just detecting whether any person appears in the image (regardless of who they are).

Whatever the criterion or criteria for detection of a person, the above detection is performed based on analysing one or more relatively-high resolution images captured by the image sensor (camera) 6 of the sensor unit 3, preferably the full resolution with which the image was originally captured. However, for privacy reasons, the code 12a running on the local processing module 11 is configured to prevent the sensor unit 3 from reporting any of these images to the external processing apparatus 20, or indeed anywhere external to the sensor unit 3. Instead, the code 12a running on the local processing module 11 is configured to report a precedence detection metric a hard (yes/no) or soft (e.g. a percentage confidence level) presence decision for each of the detections, and/or a people count over a certain window in time, or a running people count. In embodiments the code 12a may also report other associated presence metrics, e.g. a presence vector associated with each presence detection to indicate where in the captured image the person was detected; or a low-resolution matrix (e.g. <=10×10, or <=20×20) of presence decisions, with each of the blocks in the matrix indicating on a yes/no basis whether a person was detected at that point in the respective image, or with each block in the matrix indicating a soft presence decision representing the confidence as to whether a person was detected at that point. Nonetheless, the sensor unit 3 still prevented from exporting externally any image which is at a high enough resolution that a person or at least the identity of an individual person can be identified in the image, neither by a person or a computer algorithm (e.g. face recognition algorithm).

The sensor unit 3 may automatically and unconditionally report the presence detection metric(s) to the external processing apparatus 20 each time an image captured, or may report periodically. Alternatively the sensor unit 3 may automatically report the presence metric(s) to the external processing apparatus 20 only in response to an event, e.g. whenever a person is detected, or in response to a request from the processing apparatus or a user terminal.

Figure 3:
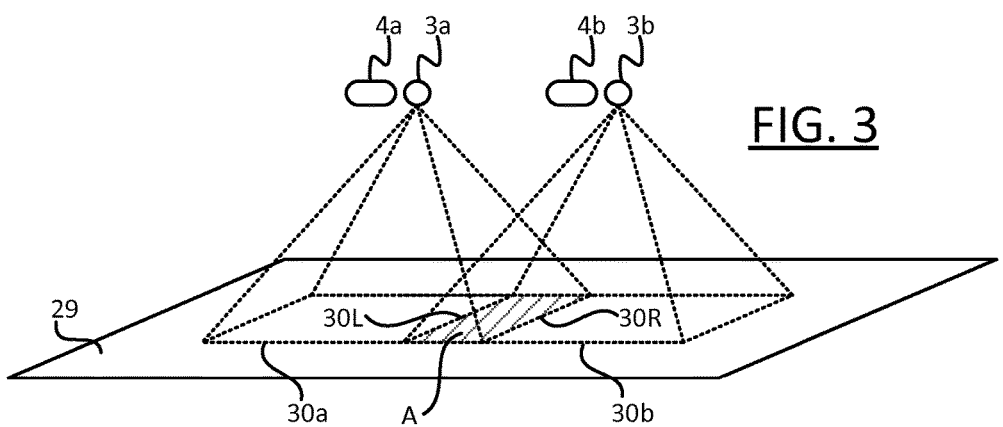
FIG. 3 is a perspective view of a pair of adjacent luminaires.

FIG. 3 shows a perspective view of a first and a second of the sensor units 3a, 3b, as described above. The first and second sensor units 3a capture images from a respective sensor area 30a, 30b, which experience light from one or more of the luminaires 4a, 4b. By way of example, each sensor unit 3a, 3b may be associated with or incorporated into a different respective one of the luminaires 4a, 4b adjacent one another in a grid, or each sensor unit 3 could be associated with a different respective group of the luminaires 4 (e.g. placed at the centre of the group).

The respective lamp 5 of each of the luminaires 4a, 4b is arranged to emit illumination towards a surface 29 (e.g. the floor, or a workspace plane such as a desk), thereby illuminating the surface 29 below the luminaires 4. As well as illuminating the environment 2, the illumination provided by the luminaires 4 renders the people 8 detectable by the sensor units 3.

The respective image sensor 6 of each sensor unit 3a, 4b has a limited field of view. The field of view defines a volume of space, marked by dotted lines in FIG. 3, within which visible structure is detectable by that sensor unit 3a, 3b. Each sensor unit 3a, 3b is positioned to capture images of the respective portion (i.e. area) 30a, 30b of the surface 29 that is within its field of view ("sensing area") below. As can be seen in FIG. 3, the fields of view of the first and second sensor units 3a, 3b overlap in the sense that there is a region of space within which structure is detectable by both sensor units 3a, 3b. As a result, one of the borders 30R of the sensing area 30a of the first sensor unit 3a is within the sensor area 32b of the second sensor unit 3b ("second sensing area"). Likewise, one of the borders 30L of the sensor area 32b of the second sensor unit 3b is within the sensor area 30a of the first sensor unit 3a ("first sensing area"). An area A is shown, which is the intersection of the first and second sensor areas 30a, 30b. The area A is the part of the surface 29 that is visible to both of the first and second sensor units 3a, 3b ("sensor overlap").

Figure 3A:
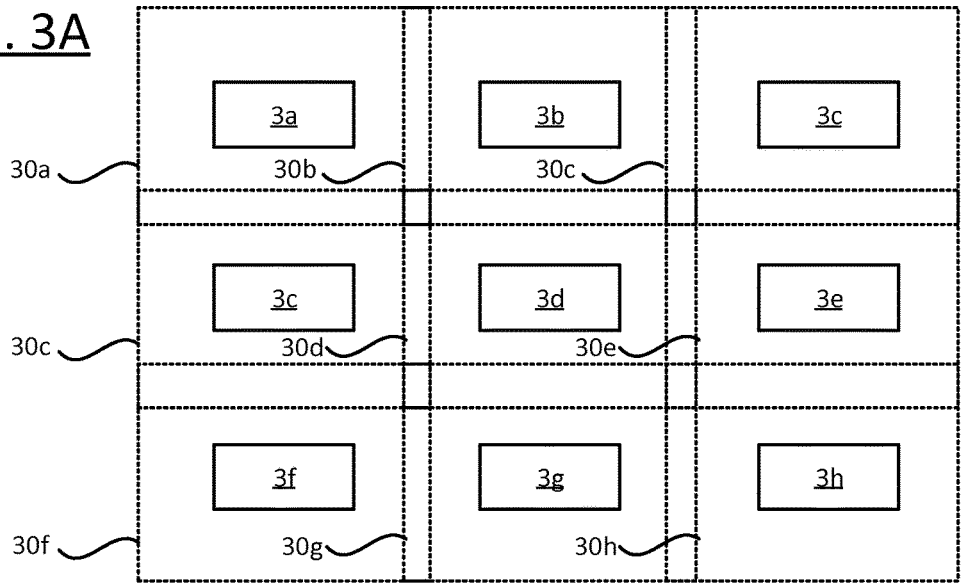
FIG. 3A is a plan view of part of a lighting system.

FIG. 3A shows a plan view of a part of the lighting system 1, in which a 3×3 grid of nine sensor units 3a, . . . , 3h is shown, each having a respective sensor area 30a, . . . , 30h, which is the sensor area of its respective image sensor 6 as described above. The sensing area 30 of each sensor unit 3 overlaps with that of each of its neighbouring sensor units 3, in both directions along the grid and both directions diagonal to the grid, as shown. Thus every pair of neighbouring sensor units (3a, 3b), (3a, 3c), (3a, 3d), (3b, 3c), . . . has an overlapping sensor area (or field of view, FoV). The overlapping sensing areas of the vision sensors ensure that there are no dead sensing regions.

Although nine sensor units 3a-h are shown in FIG. 3A, the present techniques can be applied to lighting systems with fewer or more sensor units 3. It will also be appreciated that the grid arrangement of FIG. 3A is just one example for achieving a desired overlap.

FIG. 4 shows a block diagram of the processing apparatus 20, which may take the form of a centralized processing apparatus for controlling or at least processing data from a plurality of the sensor units 3, and in embodiments a plurality of the luminaires 4. This processing apparatus 20 comprises at least one computer device for operating the lighting system 1. For example such a computer device may take the form of a server, or a static user terminal such as a desktop computer, or a mobile user terminal such as a laptop, tablet, smartphone or smart watch. Whatever form it takes, the computer device (or each of the computer devices) 20 comprises a processor 27 formed of one or more processing units, and a network interface 23. The network interface 23 is connected to the processor 27. The processor 27 has access to a memory 22, formed of one or more memory devices, such as one or more RAMs, EEPROMs, magnetic memories or optical memories. The memory 22 may be external or internal to the computer device 20, or a combination of both (i.e. the memory 22 can, in some cases, denote a combination of internal and external memory devices), and in the latter case may be local or remote (i.e. accessed via a network). The processor 27 is also connected to a display 25, which may for example be integrated in the computer device 20 or an external display.

The processor 27 is shown executing people counting code 24, from the memory 22. Among other things, the people counting code 27 applies an aggregation algorithm, to aggregate multiple local presence metrics received from different ones of the sensor units 3 so as to generate an estimate of the number of people 8 in the environment 2. In this way the processor 27 implements a processing module connected to receive data relating to the captured images of the image capturing device, and to thereby determine a count of the number or rate if people being found in the environment 2.

The network interface 23 can be a wired interface (e.g. Ethernet, USB, FireWire) or a wireless interface (e.g. Wi-Fi, Bluetooth, ZigBee), and allows the computer device 20 to connect to the gateway 10 of the lighting system 1. The gateway 10 operates as an interface between the processing apparatus 20 and the lighting network, and thus allows the central processing apparatus 20 to communication with each of the luminaires 4 and sensor units 3 via the lighting network. The gateway 10 provides any necessary protocol conversion to allow communication between the processing apparatus 20 and the lighting network. Alternatively the interface 23 may enable the processing apparatus 20 to connect directly to the luminaires 4 and senor units 3. Either way, this allows the centralized processing apparatus 20 to transmit control signals to each of the luminaires 4 and receive the low resolution versions of the captured images from each of the sensors 3.

Note that the figures herein, including FIGS. 2 and 4, are highly schematic. In particular, the arrows denote high-level interactions between components of the luminaires 4, sensor units 3 and central computer 20 and do not denote any specific configuration of local or physical connections.

Note that the processing apparatus 20 may be local to the environment 2 (e.g. present in the environment 2 or in the same building) or may be remote from it (at a remote geographic site), or the processing apparatus 20 may even comprise a combination of local and remote computer devices. Further, it may connect to the gateway 10 via a single connection or via another network other than the lighting network.

FIG. 4A shows an exemplary lighting system control architecture for implementing a remote or networked connection between the processing apparatus 20 and the gateway. Here, the processing apparatus 20 is connected to the gateway 10 via a packet based network 42, which is a TCP/IP network in this example. The processing apparatus 20 communicates with the gateway 10 via the packet based network 42 using TCP/IP protocols, which may for example be effected at the link layer using Ethernet protocols, Wi-Fi protocols, or a combination of both. The network 42 may for example be a local area network (business or home network), the Internet, or simply a direct wired (e.g. Ethernet) or wireless (e.g. Wi-Fi) connection between the processing apparatus 20 and the gateway 10. The lighting network 44 is a ZigBee network in this example, in which the luminaires 4a, 4b, 4c, . . . communicate with the gateway 10 using ZigBee protocols. The gateway 10 performs protocol conversion between TCP/IP and ZigBee protocols, so that the central processing apparatus 20 can communicate with the luminaires 4 and sensor units 3 via the packet based network 32, the gateway 10 and the lighting network 44.

Anywhere herein where there is referred to a processing apparatus 20 external to the sensor units 3 an luminaires 4, this may comprise any one or more computer devices arranged according to any of the possibilities discussed above or others. Note also that "external" or "externally" means the processing apparatus 20 is not housed within any shared housing (casing) of any of the sensor units 3, and in embodiments nor in any housing of the luminaires 4. Further, this means the processing apparatus 20 communicates with all of the involved sensor units 3 (and in embodiments luminaires 4) only using an external connection via a networked and/or wireless connection, e.g. via the gateway 10, or via a direct wireless connection.

The memory 22 of the processing apparatus 20 stores a database 21. This database 21 contains a respective identifier (ID) of each sensor unit 3 and each luminaire 4 in the lighting system 1 (or just IDs of the luminaires 4 when the sensor units 3 are integrated into luminaires 4). These uniquely identify the sensor units 3 and luminaires 4 within the system 1. Further, the database 21 also contains an associated location identifier 71 of each sensor unit 3 and luminaire (of again just the location identifiers of the luminaires 4 if the sensor units 3 are integrated into luminaires). For example, each location identifier 71 may be a two dimensional identifier (x, y) or three dimensional location identifier (x, y, z) (e.g. if the sensor units 3 are installed at different heights). The location identifier 71 may convey only relatively basic location information, such as a grid reference denoting the position of the corresponding luminaire 4 or sensor unit in a grid e.g. (m, n) for the mth column and nth row—or it may convey a more accurate location on a floor plan or map, e.g. meters, feet or arbitrary units, to any desired accuracy. The IDs of the luminaires 4 and sensor units 3, and their locations, are thus known to the processing apparatus 20. The memory 22 may also store additional metadata 26, such as an indication of the sensor overlap A, and any other sensor overlaps in the system.

Figure 5:
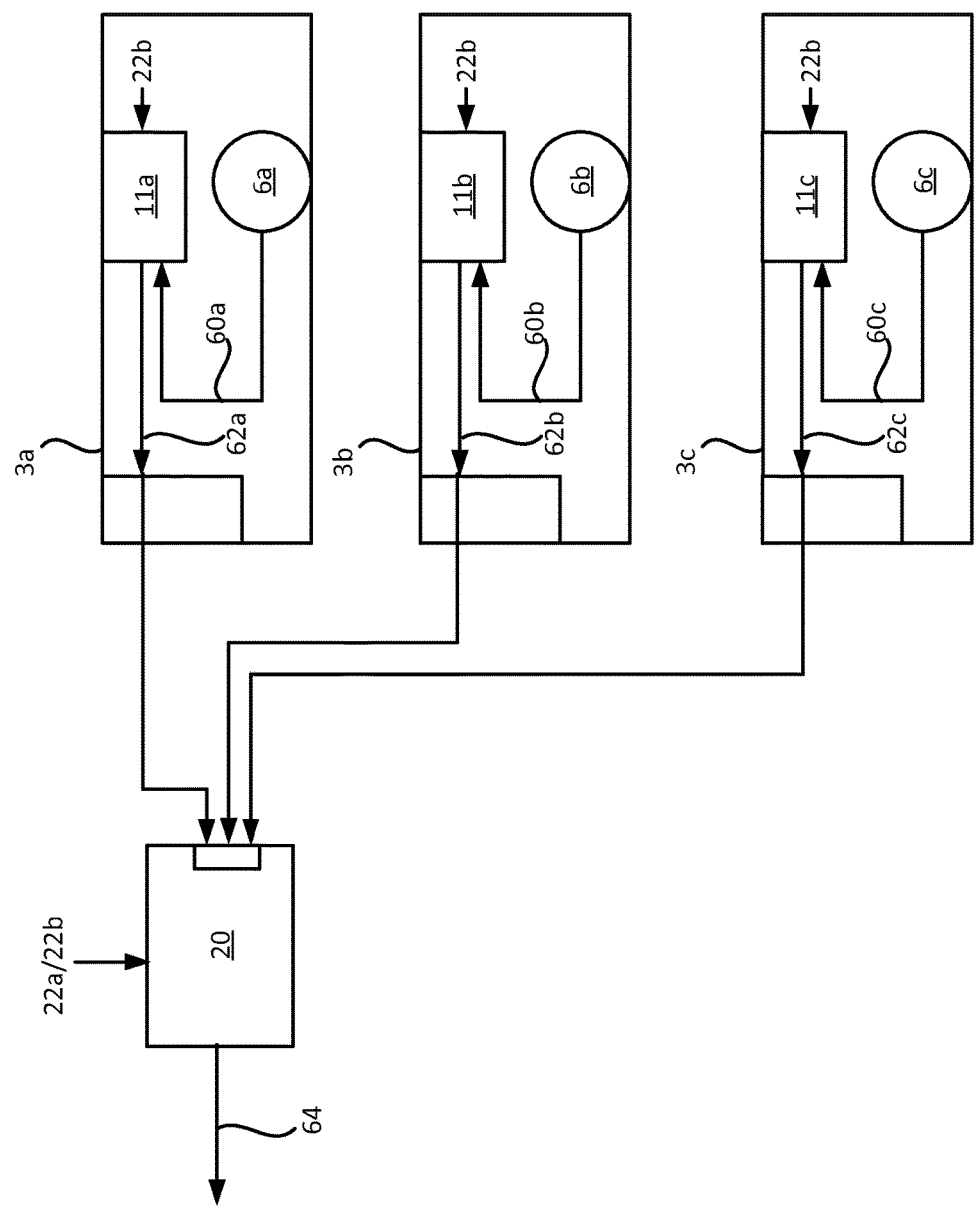
FIG. 5 illustrates how local image processors cooperate with a central processing unit to provide a people counting function.

FIG. 5 illustrates how the centralized processing apparatus 20 and the sensor units 4 cooperate within the system 1. First, second and third sensor units 3a, 3b, 3c are shown, though this is purely exemplary.

The image sensor 6 of each sensor unit 3a, 3b, 3c captures at least one respective image 60a, 60b, 60c of its respective sensing area (each of which could be a still image or a video). The local processing module 11a, 11b, 11c of that sensor unit applies the local person detection algorithm to the respective image(s). That is, the local person detection algorithm is applied separately at each of the sensor units 3a, 3b, 3c, in parallel to generate a respective local presence metric 62a, 62b, 62c at each. Each of the local presence metrics 62a, 62b, 62c is transmitted to the processing apparatus 20, e.g. via the networks 42, 44 and gateway 10. To preserve privacy, the images 60a, 60b, 60c themselves however are not transmitted to the central processing unit 20 (or at least not in a high enough resolution form for people to be recognizable or a least identifiable).

The external processing apparatus 20 applies the aggregation algorithm to the presence metrics 62a, 62b, 62c in order to estimate the number of people 8 in the environment. The aggregation algorithm generates an indicator of this number (people count) 64, which may be outputted on the display 25 to user of the processing apparatus 20 and/or stored in the memory 22 for later use.

The process may be real-time, in the sense that each local processing module 11a, 11b, 11c repeatedly generates and transmits local presence metrics as new images are captured. The people count 64 is updated as the new presence metrics are received, for example one every few (e.g. ten or fewer) seconds. Alternatively, the process may be pseudo-real-time, e.g. such that the people count 64 is updated every minute or every few minutes, or every hour (for example), or it may be pseudo-static e.g. a "one-time" people count may be obtained in response to a count instruction from the user of the external processing apparatus 20, to obtain a snapshot of current occupancy levels manually. That is, each count may be instructed manually.

In embodiments each presence metric 62 may be generated over a time window, i.e. based on multiple images within that time window. This allows movements above a certain speed to be filtered out. That is, objects moving fast enough to not appear in all of those images may be filtered out so that they do not affect the people count 64.

As discussed, in embodiments the sensor unit 3a captures images of the part of the surface 29 directly below it. This means the image 60a is a top-down view of the person 61, whereby the top of their head and shoulders are visible. Note that, in the case that the person 61 is in the sensor overlap area A, they would be similarly detectable in an image captured by the second sensor unit 3b. That is the same person 61 would be simultaneously visible in images from both the first and second sensor units 3a, 3b, at different respective locations in those images. A similar scenario can also occur even if the sensor units 3 do not face directly down, e.g. are at an angle in a corner of a room, or face sideways from the wall. It will be appreciated that the present disclosure is not limited to a top-down arrangement.

In embodiments, each sensor unit 3 (or rather its local image processor 11) communicates a respective one or more presence metrics, along with its ID and a time stamp, to the external processing apparatus 20 (e.g. a centralized people counting computer device).

The presence metric(s) reported by each sensor unit 3 comprise at least an indication of whether a person 8 is detected, or likely to have been detected, by the sensor unit 3. For example, this may comprise a yes/no flag indicating whether a person was detected. Alternatively or additionally, it may comprise a block-pixel-by-block-pixel score matrix, e.g. a 10 by 10 matrix of binary values e.g. with each element a "1" or "0", indicative of presence or no presence—this choice ensures that the communication from the sensor units 3 to the centralized processing apparatus 20 maintains privacy, and is also low rate. Another alternative or additional possibility is to report a score a probability score indicative of the probability that a person is present. The probability score may be computed over a time window, thus filtering out movements above a certain speed. These may be estimated using known statistical methods, e.g. maximum a posteriori (MAP). Further, in embodiments, the reported presence metrics may comprise a location vector denoting the location of the detected person 61, e.g. which may be expressed relative to the sensor unit 3 that captures the image 60, or as a position within the image.

The external processing apparatus 20 collects such metrics from all the sensor units 3 associated with a region over which people count is of interest (e.g. all or part of the surface 29). Additionally, the external processing apparatus 20 has knowledge of sensing region overlap of the sensor units 3, from the metadata 26. It aggregates the individual vision sensor counts while avoiding double-counts over overlapping regions within a given time window. For example, if the reported presence metric(s) from each sensor unit 3 comprise a yes/no indication of whether or not they detected a person 8, plus an associated location vector indicating where the person was detected, then the processing apparatus 20 can determine when a result from two different sensor unit 3 is within an overlap region (e.g. A in the example of FIG. 3) and occurs at approximately the same location. This may be counted as one result instead of two to avoid double counting. As another example, if the reported presence metric(s) comprise a block pixel matrix, then the processing apparatus 20 can again determine when a result from two different sensor unit 3 is within an overlap region and occurs at approximately the same location in order to avoid double counting. The regions of overlap A can be determined at the commissioning stage and pre-stored in the memory 22 as part of the metadata 26, or alternatively can be determined automatically by the processing apparatus 20 based on a correlation between the block-pixel matrices or other low resolution versions of the images if such are reported from the sensor units 3.

As a further alternative it is not necessary to have an overlap between the sensing regions 30 of different sensor units 3. While an overlap is preferred to avoid blind spots, in other embodiments double counting could instead be avoided by simply arranging the sensor units 3 to have non overlapping fields of view 30.

The above has described a system for detecting the presence of people 8 in an environment, and for counting the total number of people detected during a certain window of time. This can have a number of applications, such as marketing analysis in a retail environment; or tracking occupancy levels for safety reasons (e.g. at a sports or entertainment event); or to inform automated control of a utility such as the illumination provided by the luminaires, or heating, ventilation or air conditioning.

However, one issue recognized herein is identifying potential problems with the sensor units 3. For instance, the sensor unit 3 may develop an internal fault, e.g. the image sensing element of the image sensor 6 may fail or degrade, or the local processing module may become infected with malware. As another possibility, a person who is not authorized or who does not have sufficient know-how may interfere with the sensor unit 3. Such errors or failures may in turn lead to application errors at a higher system level that are not immediately noticeable, e.g. errors in estimated number of people over a particular space. It would be desirable to be able to detect such problems.

Figure 6:
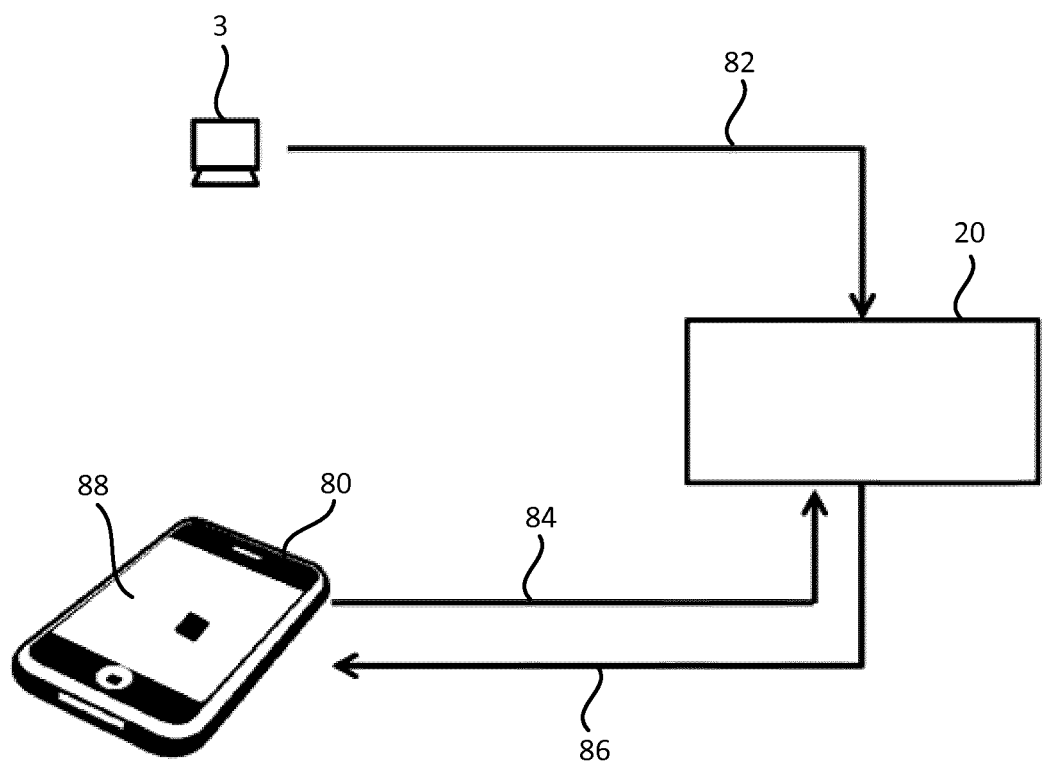
FIG. 6 is a schematic block diagram illustrating the use of a mobile device to test a vision sensor, and
FIG. 7 schematically illustrates an image sequence output by a mobile device for testing a vision sensor.

Accordingly, FIG. 6 illustrates an arrangement for performance diagnostics of a vision sensor for people counting applications. The arrangement comprises a light emitting-device 80 external to each of the sensor units 3 (not incorporated within the same housing and in embodiments not mechanically connected in any way). In embodiments, the light-emitting device 80 takes the form of a display device having a display screen, e.g. a mobile user terminal such as a smartphone, tablet or smart watch. The display device 80 is arranged to connect to the central processing apparatus 20 via a communication link, preferably a wireless communication link based on a wireless access technology such as a Wi-Fi, ZigBee, Bluetooth or Thread, etc. In embodiments, this link could be via the same network as used to connect the sensor units 3 to the central processing apparatus 20, or could be separate from that network. In embodiments, the display device 80 may be required to go through an authorization procedure to authorize it to central processing apparatus 20 before it is allowed to interact with the central processing apparatus to conduct the testing disclosed below.

In operation, the display device 80 is placed in front of the image sensor 6 of one of the vision sensors 3 which is to be tested, with the display screen of the display device 80 covering the field of view of the sensor 6 (or at least covering a substantial portion of its field of view). The display device 80 is then operated to generate a pre-defined image sequence 88 which simulates the presence of a plurality of people within the field of view of the image sensor 6 of the sensor unit 3.

In response to the emitted image sequence 88, the local processing module 11 detects (what from its perspective appears to be) that number of people in its captured images, and reports the corresponding people counting data to the central processing apparatus 20 in one or more presence detection reports 82. In embodiments the local processing module 11 is arranged to send an individual report to the central processing apparatus 20 each time a person is (apparently) detected, and the central processing module 20 is arranged to maintain a count of the detections from the individual reports. Alternatively, the local processing module 11 of the sensor unit 3 may be configured to maintain a count of the detections over a certain time window or to maintain a running count, and to report the count to the central processing apparatus 20. Either way, the central processing apparatus 20 is thus able to determine the people count resulting from the artificial image sequence 88.

The number of people simulated in the emitted image sequence 88 is a predetermined number known to a testing function 81 implemented on the display device. The testing function 81 may be implemented in the form of software stored on one or more computer-readable storage media of the display device 80, and arranged to run on one or more processing units of the display device 80; or alternatively the testing function 81 may be implemented in the form of dedicated hardware circuitry, or configurable or reconfigurable hardware circuitry such as a PGA or FPGA, or any combination of hardware and software.

In operation, the testing function 81 on the display device 80 knows the IDs and locations of each vision sensor, for example because a maintenance person inputs this information before checking the vision sensor 3. Based on the ID of a target one of the sensors 3 to be tested, the testing function 81 sends a query 84 from the display device 80 to the central processing apparatus 20, querying the central processing apparatus 20 for the (apparent) number of people reported from the vision sensor 3 in question. In reply, the processing apparatus 20 sends a response 86 back to the testing function 81 on the display device 80, reporting the requested count. The testing function 81 then automatically compares this people counting data from the vision sensor 3 with its own expected people count (i.e. the predetermined number of people simulated by the emitted image sequence 88), and based on this automatically reports the status of the vision sensor 3. If the empirical count is as expected (matches the predetermined expected count), the testing function 81 automatically declares that the sensor unit 3 is functioning properly; but if the empirical count is not as expected (does not match the predetermined expected count), then the testing function 81 automatically declares that the sensor unit 3 is faulty.

Figure 7:
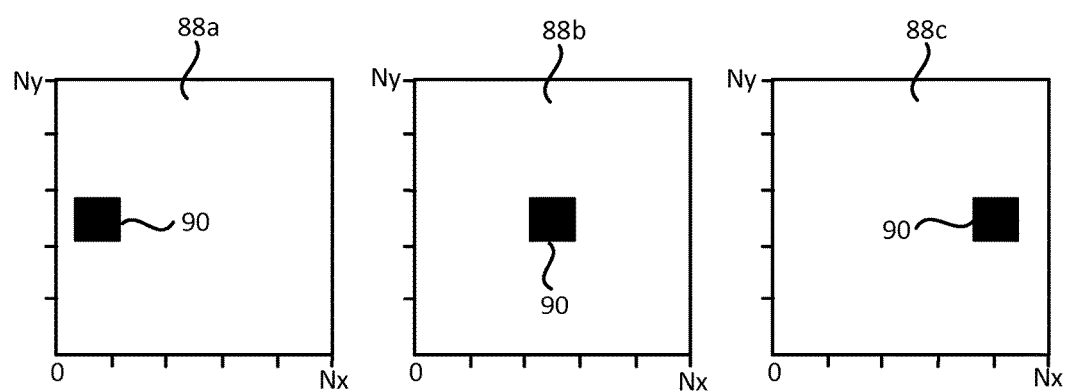

An example of the image sequence 88 is illustrated in FIG. 7. In embodiments the local processing module 11 of the sensor unit 6 is configured to detect a person purely on the basis of detecting motion on condition that an object is detected to move from one captured image to the next, or detected to move by a sufficient degree over a series of two or more of the captured images, then the local processing module 11 of the sensor unit 3 declares that a person has been detected (on the assumption that the motion is due to a living being and that the living being is a person this assumption works well in, e.g., an office environment where vehicles and animals are unlikely to be present). In such cases, the image sequence 88 emitted by the display device 80 (e.g. smartphone or tablet) need only simulate motion in order to simulate a positive presence event from the perspective of the sensor unit 3.

To this end therefore, the display device is configured to emit a sequence of output frames 88a, 88b, 88c (only three are shown for illustrative purposes, but it will be appreciated there may well be more) in which a graphical element 90 moves from one frame to the next. Preferably the sequence progresses automatically, such that once initiated, each successive frame is output automatically by the display device 80. In some embodiments, the image sequence 88 may include multiple distinct elements 90 to simulate motion of multiple people (and the presence of these elements 90 in the image sequence 88 may overlap in time or not). When the screen of the display device 80 is presented to the image sensor 6 (preferably held up to the image sensor 6 so as to fill a substantial portion of its field of view), then if working properly the local processing module 11 of the sensor unit 3 will declare a positive presence detection for each of the moving graphical element. Because in these embodiments the sensor unit 3 only works based on motion—and is only expected to work based on motion even if functioning properly—then the graphical element(s) 90 need only be a simple shape such as a square.

As an alternative, the local processing module 11 of the sensor unit 6 may be configured to detect a person not on the basis of motion, but instead based on an image recognition algorithm applied to the captured images, wherein the image recognition algorithm is configured to declare a positive detection of a person on condition of recognizing a human body or at least a human body part in one of the captured images (or perhaps over a series of two or more of the captured images to avoid false positives). In this case the graphical element 90 in the emitted image sequence 88 need not move, but instead comprises a graphical representation of a human, or at least a graphical representation of the human body part or one of the human body parts which the image recognition algorithm is configured to detect, e.g. a human face. When the screen of the display device 80 is presented to the image sensor 6 of the sensor unit 3 (again preferably held up to the image sensor 6 so as to fill a substantial portion of its field of view), then the image recognition algorithm running on the local processing module 11 will declare a positive detection. Over the course of the displayed sequence 88, a plurality of such graphical elements are presented, either overlapping in time or not, so as to simulate the presence of one or multiple people in the sensor's field of view.

As another possibility, the above approaches could be combined—i.e. the local processing module 11 of the sensor unit 6 may be configured to detect a person on condition of detecting the appearance of a human body or body part, and on condition that the body or body part is detected to move over a series of two or more of the captured images. In this case the graphical element 90 (or each of the graphical elements) in the emitted frames 88 comprises a moving representation of a human body or body part.

Whatever form of detection and simulation is used, if no-response or a wrong count of people is given by the vision sensor 3, then the test function 81 running on the display device 80 reports the status of the vision sensor as failed. If on the other hand the correct count of people is given by the vision sensor 3, then the test function 81 reports the status of the vision sensor 3 as successful. This may comprise outputting the determined status to the maintenance person (the user of the display device 80) via a user interface of the display device 80, e.g. on screen or audibly. Alternatively or additionally, the testing function 81 may report the status to another device other than the display device 80, e.g. to the central processing apparatus 20, where it can be viewed by the maintenance technician or other user, or even be acted upon automatically. E.g. the central processing apparatus 20 may be configured to automatically take the offending sensor unit 3 out of service, and/or to automatically remove its recent statistics from an electronic results document compiling the results from multiple sensors 3, or flag those statistics as being suspect.

Note: in embodiments, the predetermined number may be dynamically variable. That is, it only need be predetermined for a given test, but over time from test-to-test it varies. I.e. when the test sequence 88 is emitted on a first occasion (e.g. a first calendar date) it simulates a first predetermined number; but when the test sequence 88 is emitted on another, second occasion (e.g. another calendar date) as part of a separate instance of the test, then it simulates a second predetermined number that is different from the first predetermined number. This may be desired to avoid missing coincidental or selective errors. The variation from test-to-test may be predetermined or random.

In further embodiments, an escape code in the form of an additional on-screen tag may be included in one, some or all of the frames 88 of the image sequence emitted by this display device display. E.g. the display device might blink its display with a given frequency, or include a particular recognizable icon somewhere in one or more of the emitted frames 88 (e.g. in the corner). This tag may be used to indicate to the vision sensor unit 3 that the current events to whish the sensor 3 is being subjected are a "test in progress". The local processing module 11 on the sensor unit 3 is configured to detect this tag and take appropriate action. Particularly, the local processing module 11 may be configured so as, in response to detecting the tag, to switch to a special test mode (i.e. a diagnostic mode).

In the test mode, the local processing module 11 is configured to take steps to indicate in some way that the people counting result or results originating from the test sequence 88 are distinct from any actual operational results detected in normal operation (that is to say, outside of the test, not due to any artificial test sequence; i.e. actual functioning statistics, resulting from actual observations of the environment 2). This indication may take any of a number of possible forms. For instance, said indication may comprise storing the test result(s) on the image sensor 3 in a different, distinct storage location than the operational results, and/or marking the result(s) with metadata in storage on the sensor 3 to mark them as being test results as opposed to operational results. Alternatively or additionally, this indication may comprise marking the test result(s) with metadata in the presence report(s) 82 sent to the central processing apparatus 20, so that the processing apparatus can distinguish between them. In embodiments, based on this marking in the presence report(s) 82, the central processing apparatus 20 may be configured store the test result(s) as being distinct from the operational result(s), e.g. again by storing in distinct storage locations and/or marking them in storage with metadata that distinguishes between the two types of results. N.B. an equivalent to marking the test results with metadata is to mark the operational results with metatdata.

In a variant of the above, the test mode (causing the test result(s) to be signalled and/or stored in a distinct manner) may be triggered not by a tag in the image sequence 88 emitted by the displayed device, but instead by a special escape sequence (debug sequence) signalled by one or more other light sources arranged to emit light into the environment 2. Particularly, this may be implemented using one or more of the networked luminaires 4. In this case a controller such as the central processing apparatus 20, or the test function 81 running on the display device 80, controls one or more of the networked luminaires 4 to flash in a predetermined temporal or spatio-temporal dimming pattern. The local processing module 11 on the sensor unit 3 is configured to detect this pattern via its respective image sensor 6, and to recognize it as a predetermined escape sequence (i.e. a signal that takes the sensor unit 3 out of its normal mode of operation). In response, the local controller 11 thus controls the sensor unit 3 to switch to the test mode, where the test result(s) resulting from the test sequence 88 are kept distinct from the operational results (e.g. in one or more of the same ways as discussed above in relation to the image tag option).

In a further variant of the above, the escape code may be signalled by means of an embedded tag invisibly modulated into the light emitted by the screen of the light emitting device 80, or an embedded code invisibly modulated into the light emitted by one or more other light sources in the environment (e.g. one or more networked luminaires 4). E.g. the code may take the form of a specific modulation frequency or modulation frequencies which the local processing module 1 on the sensor unit 3 is configured to recognize as signalling a switch to the diagnostic mode. As another example, the code could be embedded using a suitable data encoding technique for encoding data into light, e.g. a frequency shift keying, amplitude keying, phase keying, pulse width modulation or pulse position modulation technique.

Note: in the above, the testing function 81 has been described as being implemented in the display device 80 (preferably a mobile user terminal such as a smartphone or tablet), which is separate from both the sensor units 3 and the central processing apparatus 20. However, this is not the only option. Alternatively for example, the test function 81 may be implemented in the centralized processing apparatus 20 (e.g. a server such as lighting controller or buildings controller server, or a dedicated lighting or building controller unit). In such cases, the test function 81 may be arranged to control the display device 80 to emit its respective test pattern 88, and then following this to perform the comparison of the expected results with the actual obtained results, in a similar manner to that discussed above (but without the exchange of messages 84, 86 with the display device 80).

In yet further alternative or additional embodiments, the device 80 used to emit the test pattern need not be a display device comprising a screen. Instead, it may take the form of some other form of light-emitting device, such as a set of visible light sources (e.g. LEDs, lamps, LED strips, spotlights, laser pointers) or a movable light source (e.g. spot light or laser pointer) that is used to create a visible light test pattern.

For instance, especially if densely spaced, a set of the networked luminaires 4 or other light sources in the environment 2 may be used to create a predetermined test pattern, by switching on or dimming up the lights in a spatio-temporal sequence that simulates the movement of an object. If, say, a first light source in a spatial sequence (e.g. a row) turns on, then that light source turns off and a second light source adjacent to the first in the spatial sequence turns on, and then that light source turns off and a third, successive light source adjacent to the second in the spatial sequence turns on, etc., this may be used to simulate motion of an object in the environment 2. If the sensor unit 3 also works based on motion rather than image recognition, this can then be used to test the sensor in a similar manner as described above in relation to FIG. 7, but using the apparently "moving" lighting element instead of the graphical element 90.

As another example, a movable or directable light source can be used to create a similar effect. That is, using a light source such as a spot light or even a handheld laser point which is operable to emit light in a controllable direction, this can again be used to simulate movement of an object and thereby test the operation of a vision sensor unit 3.

Where the test pattern is created by a device comprising one or more light sources instead of a display device, the test function 81 may be embedded in this lighting device and configured to interact with the central processing apparatus 20 in a similar manner as discussed in relation to FIG. 6. Alternatively the one or more light sources may be controlled to emit the test pattern by a test function 81 implemented in the central controller 20 (e.g. server). Or in the case of a handheld light source such as a laser pointer, the pattern can even be created manually by a maintenance technician.

It will be appreciated that the above embodiments have been described by way of example only.

For instance, the computer device 20 performing the people counting does not necessarily have to be the same computer device as used to check for problems such as errors or faults, and nor do either of these have to be the same as the computer device 20 that controls the luminaires 4. More generally, the processing apparatus 20 described above may represent any one or more computer devices working together or independently to provide any of the above-described functions (and where multiple such computer devices are involved, structurally speaking each may comprise respective instances of any of the components discussed above in relation to FIG. 4 or 4A). For example, the processing apparatus 20 may comprise a first computer device such as a server or a desktop or laptop computer arranged receive the presence metrics 64 from the sensor units 3 and to perform the people counting based on these, and a second computer device such as a static or mobile user terminal (e.g. desktop, laptop, tablet, smartphone or smart watch) arranged to receive the low resolution test images and check for errors or faults based on these. E.g. the second computer device may be mobile commissioning terminal, such as a smartphone or tablet running a commissioning application, which the commissioning technician uses to check for commissioning errors during the commissioning phase; whilst the first computer device may be a computer used for the actual occupancy detection and people counting during the operational phase. Further, the functionality of controlling the illumination emitted by the luminaires 4 may be implemented in either the first computer device, or the second computer device, or a third computer device separate from both of these.

Furthermore, while the above has been described in terms of the image sensors 6 being conventional visible light cameras, in other embodiments one, some or all of the image sensors may alternatively or additionally capture their images based on light outside the visible spectrum. E.g. each of one, some or all of the image sensors 6 may each take the form of a thermal camera comprising a thermopile array, which captures thermal images based on infrared radiation. In such cases, the light emitting device 80 is configured to emit a spatio-temporal sequence test pattern in the relevant part of the non-visible light spectrum, but otherwise in an analogous manner as described elsewhere herein.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of testing a sensor unit comprising an image sensor and a local processing module, wherein the local processing module is configured to detect, locally at the sensor unit, whether a person appears in images captured by the image sensor; the method comprising:
   causing a light-emitting device, external to the sensor unit, to emit a test pattern toward the image sensor of the sensor unit so as to cover at least a substantial portion of the field of view of the image sensor, to be captured over a series of the images captured by the image sensor, the test pattern comprising a spatio-temporal pattern of light simulating presence of a predetermined number of people appearing in view of the image sensor over time, wherein said predetermined number is more than one;
   at a processing apparatus external to the sensor unit, receiving one or more presence detection reports from the sensor unit indicating an apparent people count detected using the sensor unit, the apparent people count being a number people detected by the local processing module based on the captured images of the test pattern; and
   reporting the apparent people count to a testing function, wherein testing function compares the apparent people count with the predetermined number of people simulated by the test pattern, and, based on said comparison, determining whether the sensor unit is functioning correctly.

2. The method of claim 1, wherein:
   the processing apparatus is implemented in said external device; or
   the processing apparatus is a centralized processing apparatus arranged to receive presence detection reports from the sensor unit and one or more other sensor units, the centralized processing apparatus being separate from said light-emitting device.

3. The method of claim 1, wherein the light-emitting device is a mobile user terminal comprising a display screen, and wherein the test pattern comprises a sequence of frames displayed on said display screen, in which a plurality of graphical elements simulate the presence of said predetermined number of people to the sensor unit.

4. The method of claim 3, wherein the local processing module of the sensor unit is configured to perform said detection based on detecting motion in the captured images, and wherein said graphical elements simulate the presence of said predetermined number of people by moving within a frame area of the displayed frames.

5. The method of claim 3 wherein the local processing module of the sensor unit is configured to perform said detection based on an image recognition algorithm applied to the captured images to recognise human bodies or human body parts in the captured images, and wherein said graphical elements simulate the presence of said predetermined number of people by graphically representing human bodies or human body parts in the displayed frames.

6. The method of claim 1, wherein the light-emitting device comprises a directable illumination source operable to emit illumination in a controllable direction, wherein the local processing module of the sensor unit is configured to perform said detection based on detecting motion in the captured images, and wherein the test pattern is created by varying the direction of the directable illumination source over time.

7. The method of claim 1, wherein the light-emitting device comprises a set of illumination sources, wherein the local processing module of the sensor unit is configured to perform said detection based on detecting motion in the captured images, and wherein the test pattern is created by turning on or dimming up different ones of the set of illumination sources in a sequence over time.

8. The method of claim 1, wherein:
   the sensor unit is operable in an operational mode and a diagnostic mode, wherein in the diagnostic mode the apparent people count is indicated as being distinct from any people counting results obtained when said detection of people is performed in the operational mode; and
   wherein the method comprises operating the light-emitting device, or one or more other illumination sources, to emit light toward the image sensor of the sensor unit signalling a predefined escape code, wherein the sensor unit is configured to recognize the escape code and is triggered by said recognizing of the escape code to enter the diagnostics mode.

9. The method of claim 1, wherein:
   the one or more presence detection reports comprise a plurality of reports each indicating an individual detection of a person, and the apparent people count is counted by the external processing apparatus based on the plurality of reports; or the apparent people count is counted at the local processing module of the sensor unit, and the one or more reports comprise one report reporting the people count.

10. The method of claim 1, wherein the method is repeated on a plurality of occasions, and said predetermined number varies between different ones of said occasions.

11. The method of claim 1, wherein the image sensor of the sensor unit is a visible light camera, and the test pattern is a visible test pattern comprising a spatio-temporal pattern of visible light simulating the presence of said predetermined number of people to the sensor unit.

12. A non-transitory computer-readable storage comprising a computer program product for testing a sensor unit comprising an image sensor and a local processing module, wherein the local processing module is configured to detect, locally at the sensor unit, whether a person appears in images captured by the image sensor; the computer program product the computer program product being configured so as when executed on one or more processors of one or more devices to perform operations of: causing a light-emitting device, external to the sensor unit, to emit a test pattern toward the image sensor at the sensor unit to be captured over a series of the images captured by the image sensor, the test pattern comprising a spatio-temporal pattern of light simulating presence of a predetermined number of people appearing in view of the image sensor over time, wherein said predetermined number is more than one; at a processing apparatus external to the sensor unit, receiving one or more presence detection reports from the sensor unit indicating an apparent people count detected using the sensor unit, the apparent people count being a number people detected by the local processing module based on the captured images of the test pattern; and receiving a report of the apparent people count and comparing the apparent people count with the predetermined number of people simulated by the test pattern, and, based on said comparison, determining whether the sensor unit is functioning correctly.

13. A system comprising:

a sensor unit comprising an image sensor and a local processing module, wherein the local processing module is configured to detect, locally at the sensor unit, whether a person appears in images captured by the image sensor;

a light-emitting device external to the sensor unit, configured to emit a test pattern toward the image sensor of the sensor unit so as to cover a substantive portion of a field of view of the image sensor and thereby be captured over a series of the images captured by the image sensor, the test pattern comprising a spatio-temporal pattern of light simulating presence of a predetermined number of people appearing in view of the image sensor over time, wherein said predetermined number is more than one; and processing apparatus operatively coupled to the sensor unit but external to the sensor unit, wherein the external processing apparatus is arranged to receive one or more presence detection reports from the sensor unit indicating an apparent people count detected using the sensor unit, the apparent people count being a number people detected by the local processing module based on the captured images of the test pattern;

wherein the processing apparatus or light-emitting device comprises a testing function configured to receive the apparent people count and to compare the apparent people count with the predetermined number of people simulated by the test pattern, and, based on said comparison, to determine whether the sensor unit is functioning correctly.

14. A light-emitting device for use in the system of claim 13, wherein the light emitting device comprises the processing apparatus and is arranged to receive the one or more presence detection reports from the sensor unit via one of a direct route and an indirect route.

15. A processing apparatus for use in the system of claim 13, wherein the processing apparatus is a centralized processing apparatus and the centralized processing apparatus is arranged to receive the one or more presence detection reports, via one of a direct route and indirect route, from the sensor unit, the centralized processing apparatus being separate from said light-emitting device.

* * * * *